(12) United States Patent
White (10) Patent No.: US 10,899,429 B2
(45) Date of Patent: Jan. 26, 2021

(54) VEHICLE

(71) Applicant: BAE Systems plc, London (GB)

(72) Inventor: Andrew Charles White, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 16/637,799

(22) PCT Filed: Aug. 10, 2018

(86) PCT No.: PCT/GB2018/052283
§ 371 (c)(1),
(2) Date: Feb. 10, 2020

(87) PCT Pub. No.: WO2019/034851
PCT Pub. Date: Feb. 21, 2019

(65) Prior Publication Data
US 2020/0255119 A1    Aug. 13, 2020

(30) Foreign Application Priority Data

Aug. 15, 2017  (GB) .................................... 1713062.6
Aug. 21, 2017  (EP) ..................................... 17187056

(51) Int. Cl.
*B64C 9/08*  (2006.01)
*B64C 3/42*  (2006.01)
(Continued)

(52) U.S. Cl.
CPC .................. *B64C 9/08* (2013.01); *B64C 3/42* (2013.01); *B64C 9/02* (2013.01); *B64C 5/10* (2013.01)

(58) Field of Classification Search
CPC .... B64C 5/02; B64C 5/10; B64C 9/02; B64C 9/06; B64C 13/30; B64C 15/12;
(Continued)

(56) References Cited

U.S. PATENT DOCUMENTS

| | | | | |
|---|---|---|---|---|
| 2,621,871 A | * | 12/1952 | Robert | .................... B64C 15/12 |
| | | | | 244/52 |
| 3,240,448 A | * | 3/1966 | Schaffer | .................... B64C 9/02 |
| | | | | 244/87 |

(Continued)

FOREIGN PATENT DOCUMENTS

| CN | 105667764 A | 6/2016 |
|---|---|---|
| CN | 105752319 A | 7/2016 |

(Continued)

OTHER PUBLICATIONS

PCT Search Report and Written Opinion for Application No. PCT/GB2018/052283 dated Sep. 26, 2018, 8 pages.

(Continued)

*Primary Examiner* — Christoper D Hutchens
(74) *Attorney, Agent, or Firm* — Maine Cemota & Rardin (57) ABSTRACT

The present invention provides a vehicle comprising: a rotor and a stator; at least one planar control surface coupled to the rotor, wherein the rotor is configured to rotate relative to the stator such that, in use, the at least one planar control surface moves from a first position to a second position, and wherein in the first position the planar control surface is controllable to affect substantially only the pitch of the vehicle and in the second position the planar control surface is controllable to affect substantially both of the pitch and yaw of the vehicle, or substantially only the yaw, or in the first position the planar control surface is controllable to affect substantially only the yaw of the vehicle and in the second position the planar control surface is controllable to affect substantially both of the pitch and yaw of the vehicle, or substantially only the pitch of the vehicle. The present invention also provides a method of controlling a vehicle.

20 Claims, 8 Drawing Sheets

(51) Int. Cl.
*B64C 9/02* (2006.01)
*B64C 5/10* (2006.01)

(58) Field of Classification Search
CPC ....... B64C 29/0075; B64C 3/42; F02K 1/002; F02K 1/004; F02K 9/84; F42B 10/64; F42B 10/666
See application file for complete search history.

(56) References Cited

U.S. PATENT DOCUMENTS

| | | | |
|---|---|---|---|
| 3,295,224 A | | 1/1967 | Cappel |
| 3,436,021 A | * | 4/1969 | Walton ................ F02K 9/84 239/265.35 |
| 4,163,534 A | * | 8/1979 | Seeger ................ F42B 10/666 244/3.22 |
| 4,354,646 A | | 10/1982 | Raymer |
| 5,096,143 A | | 3/1992 | Nash |
| 7,717,370 B2 | | 5/2010 | Levy |
| 2002/0158146 A1 | * | 10/2002 | Lair .................... F02K 1/70 239/265.19 |

FOREIGN PATENT DOCUMENTS

| | | | |
|---|---|---|---|
| FR | 2681832 A1 | * 4/1993 | ............... B64C 5/10 |
| FR | 2681832 A1 | 4/1993 | |
| GB | 145770 A | 1/1921 | |
| GB | 1547882 A | 6/1979 | |
| GB | 2010195 A | 6/1979 | |
| JP | H1016891 A | 1/1998 | |
| JP | S6428096 A | 4/2016 | |

OTHER PUBLICATIONS

Extended European Search Report for Application No. 17187056.1 dated Oct. 19, 2017, 8 pages.
Great Britian Search Report for Application No. 1713062.6 dated Jan. 31, 2018, 5 pages.
International Preliminary Report on Patentability for Application No. PCT/GB2018/052283 dated Feb. 18, 2020, 8 pages. European Patent Office. Geneva, Switzerland.

* cited by examiner

VEHICLE

RELATED APPLICATIONS

This application is a national phase application filed under 35 USC § 371 of PCT Application No. PCT/GB2018/052283 with an International filing date of Aug. 10, 2018, which claims priority of GB Patent Application 1713062.6 filed on Aug. 15, 2017 and EP Patent Application 17187056.1 filed on Aug. 21, 2017. Each of these applications is herein incorporated by reference in its entirety for all purposes.

FIELD

This specification relates generally to a vehicle and a method of controlling a vehicle. More specifically, the present invention relates to a vehicle having an adaptable control surface.

BACKGROUND

In a typical aircraft configuration, the empennage (i.e. rear section of the fuselage) includes a horizontal tail plane for controlling not only vertical stability but the pitch of the aircraft. The empennage also includes one or two vertical tail fins for controlling lateral stability and yaw. Either portions (i.e. elevators and rudders) of these control surfaces or these control surfaces in their entirety are rotatable about the lateral axis of the respective control surface.

While known control surfaces allow directional control of the aircraft, they do not provide a means to control the radar return signature and performance envelope of the aircraft. The same problem can be found on other vehicles, such as submarines, missiles, and torpedoes. The present invention seeks to address at least this problem across a range of platforms.

SUMMARY

According to a first aspect of the present invention, there is provided a vehicle comprising:
 a rotor and a stator;
 at least one planar control surface coupled to the rotor,
 wherein the rotor is configured to rotate relative to the stator such that, in use, the at least one planar control surface moves from a first position to a second position, and wherein:
  in the first position the planar control surface is controllable to affect substantially only the pitch of the vehicle and in the second position the planar control surface is controllable to affect substantially both of the pitch and yaw of the vehicle, or substantially only the yaw, or
  in the first position the planar control surface is controllable to affect substantially only the yaw of the vehicle and in the second position the planar control surface is controllable to affect substantially both of the pitch and yaw of the vehicle, or substantially only the pitch of the vehicle.

As such, the vehicle is adaptable to change the control dynamics and/or profile of the vehicle during operation of the vehicle. The actuating system for adapting the vehicle can be lightweight and uncomplicated relative to the number of actuators required to adapt the control surface by the same degrees of freedom by conventional means. Due to the vehicle not requiring a pivot point in the root of the planar control surface, the radar cross section of the vehicle tends to be reduced.

The longitudinal axis of the vehicle and central axis of the stator may be arranged in parallel.

In the first position, the planar control surface may be substantially co-planar with the local horizontal plane of the vehicle and in the second position the planar control surface may be arranged in a plane at 45 degrees to the local horizontal plane.

The vehicle may comprise an actuating system, comprising:
 at least one actuator coupled to the rotor and to the stator, wherein the control surface is coupled to the rotor such that the control surface extends perpendicularly from the periphery of the rotor wherein, in use, when a first actuator is in a first configuration the rotor is rotated such that the planar control surface is arranged in the first position, and when the first actuator is in a second configuration the rotor is rotated such that the planar control surface rotates about the central axis of the rotor to be arranged in the second position.

The at least one actuator may comprise a piston and the at least one actuator may be pivotably connected to the stator and to the rotor.

The at least one actuator may comprise a plurality of actuators arranged in pairs. The plurality of actuators may comprise only three pairs of actuators.

The plurality of actuators may define an elongate space having the stator and rotor disposed at the longitudinal ends of the elongate space, and wherein the stator and rotor are annular. An engine may be disposed in the elongate space. The at least one actuator may be configured to incline the central axis of the rotor with respect to the central axis of the stator in order to vector the thrust of the engine.

In use, when one actuator expands another actuator may retract to cause rotation of the rotor. Particularly, within the pairs of actuator, as one actuator extends, the other can retract to cause rotation of the rotor.

The planar control surface may comprise a portion for controlling the direction of the vehicle, the portion being moveable independently of the planar control surface.

The vehicle may comprise a second rotor and a second stator, the second rotor being coupled to a second planar control surface, wherein the second rotor may be configured to rotate relative to the second stator such that, in use, the second planar control surface moves from the first position to the second position, and wherein the rotor may be arranged adjacent and parallel to the second rotor such that the planar control surface and the second planar control surface are arranged on opposite sides of the vehicle with respect to each other. The vehicle may be an aircraft.

The planar control surface may be a tail plane. Alternatively, the planar control surface may be a canard.

The rotor may be a tail cone.

According to a second aspect of the present invention, there is provided a method of controlling a vehicle comprising rotating a rotor relative to a stator, a planar control surface being coupled to the rotor, such that the planar control surface moves from a first position to a second position, wherein:
 in the first position the planar control surface is controllable to affect substantially only the pitch of the vehicle and in the second position the planar control surface is controllable to affect substantially both of the pitch and yaw of the vehicle, or substantially only the yaw, or
 in the first position the planar control surface is controllable to affect substantially only the yaw of the vehicle and in the second position the planar control surface is controllable to affect both of the pitch and yaw of the vehicle, or substantially only the pitch.

The method may comprise rotating the rotor +/−22.5 degrees relative to the stator to effect a 45 degree rotation of the planar control surface relative to a fixed plane.

The method may comprise changing a flow path through the vehicle by controlling at least one actuator to incline the central axis of the rotor relative to the central axis of the stator.

The method may comprise controlling a first one of a plurality of actuators to expand while controlling a second one of the plurality of actuators to retract to cause rotation of the rotor.

BRIEF DESCRIPTION OF THE DRAWINGS

Embodiments will now be described, by way of non-limiting example, with reference to the accompanying drawings, in which.

DETAILED DESCRIPTION

Embodiments herein relate generally to an actuating system for adapting a control surface of a vehicle to suit the mode of the vehicle. For example, the present invention may relate to a tail structure for an aircraft having control surfaces able to reposition from the local horizontal plane toward the local vertical plane (or a midpoint between the horizontal and vertical planes) depending on whether the pilot requires high speed, stealth or high levels of lateral control. Each of these conditions are variables, among others, that define a mode, such as supersonic cruising mode, enemy airspace infiltration mode, or dogfighting mode.

An aircraft 100 on which the present invention is implemented will now be described with reference to FIG. 1. The aircraft 100 shown here is a fighter jet, but equally the invention can also be implemented on unmanned aerial vehicles (UAVs), transport, intelligence-gathering, airborne early warning and control, maritime patrol or civilian aircraft. In other embodiments, instead of an aircraft 100, the invention is implemented on other vehicles such as a weapon (for example a cruise missile, ICBM, torpedo, air-to-air missile, air-to-ground missile or guided rocket), a waterborne or submersible vessel (for example, a hovercraft, submarine, or ship), or land vehicles such as tanks for controlling the direction of the main gun or turret, or direction of an antenna.

It should be noted that the local axis of the aircraft 100 moves with the airframe, and therefore the axes, directions and control inputs defined herein below are relative to the local axis system of the aircraft 100 rather than the global frame of reference.

Figure 1:
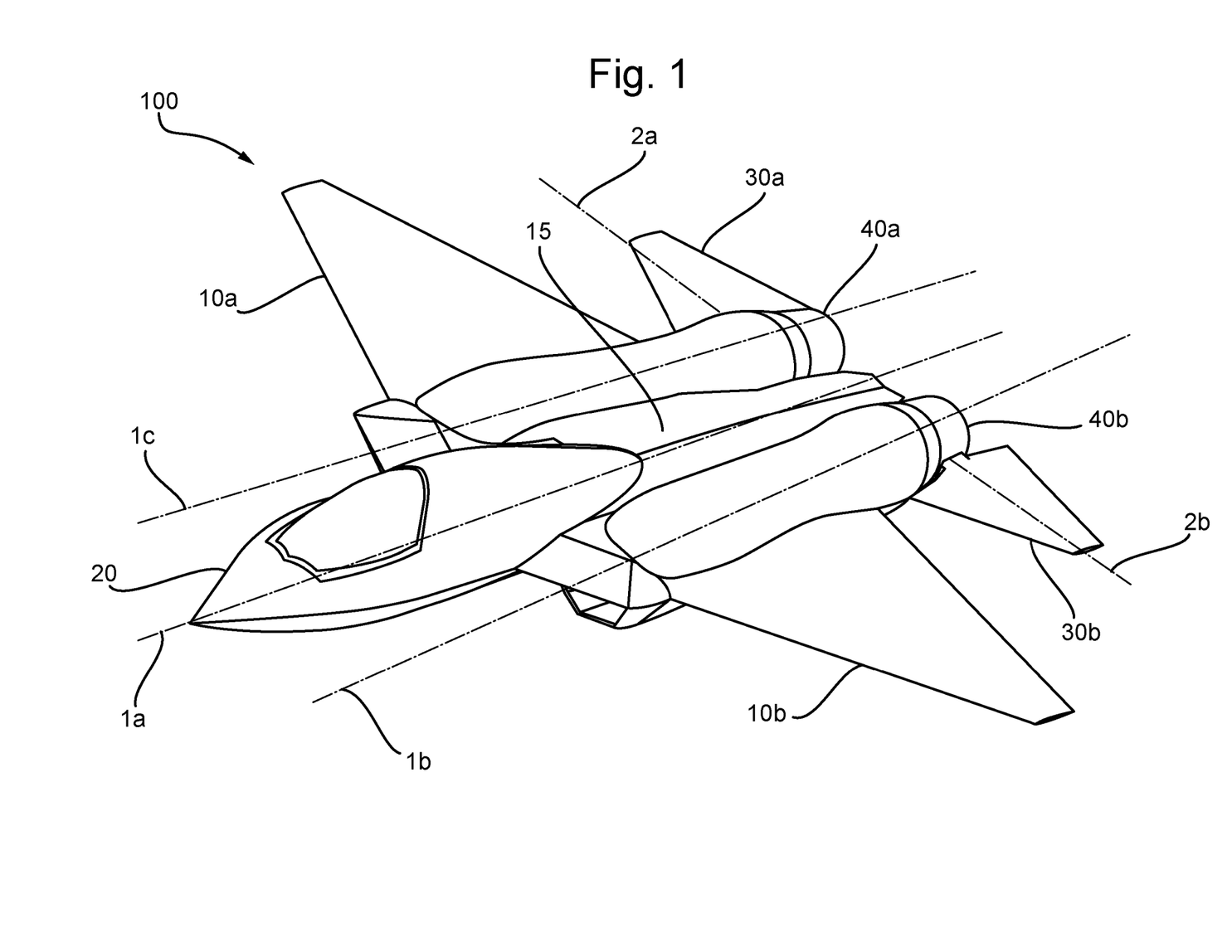
FIG. 1 is a perspective view of an aircraft according to embodiments of the present invention.

The aircraft 100 shown in FIG. 1 has a nose section 20, wings 10a, 10b, fuselage 15 (i.e. main body), engine exhaust nozzles 40a, 40b and tail surfaces 30a, 30b. Although two engine exhaust nozzles 40a, 40b are shown, in some embodiments the aircraft 100 has only one engine and associated nozzle 40a, 40b. Furthermore, in some embodiments, the aircraft 100 further includes canards disposed on the fuselage 15 between the wings 10a, 10b and the nose 20. The tail surfaces 30a, 30b and canards are used to control the pitch of the aircraft 100 and stabilise the aircraft 100 in the local horizontal plane (otherwise known as the common fuselage horizontal datum) when the lateral axes 2a, 2b of the tail surfaces 30a, 30b or canards are in the local horizontal plane. To cause the aircraft 100 to perform a lateral roll, the tail surfaces 30a, 30b are independently rotatable about their respective lateral axes 2a, 2b. In other words, the tail surfaces 30a, 30b and canards are control surfaces. In other embodiments, the tail surfaces 30a, 30b may not be rotatable about their lateral axes 2a, 2b and could comprise parts rotatable relative to the remaining parts of the tail surfaces 30a, 30b to control the pitch of the aircraft 100. In other words, in some embodiments the tail surfaces 30a, 30b comprise elevators.

Three longitudinal axes 1a, 1b, 1c of the aircraft 100 are shown drawn through the aircraft 100. The fuselage 15 centre line 1a, or primary longitudinal axis, passes through the aircraft 100 from nose 20 to tail, and equally bisects the aircraft 100. The port engine centre line 1b passes along the length of the port engine. The starboard engine centre line 1c passes along the length of the starboard engine. The lateral axis 2a, 2b of each tail surface 30a, 30b is shown drawn through the tail surfaces 30a, 30b from their outboard edge to the inboard edge. The lateral axes 2a, 2b may be perpendicular to the primary longitudinal axis 1a of the aircraft 100.

The rear section of the aircraft 100 having the tail surfaces 30a, 30b is known as an empennage (or tail assembly).

An actuating device 200 for use in controlling the tail surfaces 30a, 30b will now be described with reference to FIG. 2. The same actuating device 200 is adaptable for use in controlling other control surfaces, such as canards and the main wings 10a, 10b. The actuating device 200 is capable of achieving six degrees of freedom, namely X, Y, Z translations and X, Y, Z rotations. While the actuating device 200 is physically capable of achieving these diverse degrees of freedom, in certain embodiments these degrees of freedom are limited by software such that the central point of a rotatable member 220a does not move out of alignment with the central point of a fixed member 220b. In other words, the rotatable member 220a is only rotated relative to the fixed member 220b, and not translated.

The actuating device 200 includes a plurality of linear actuators 210. As will be explained later, for optimum translations and rotations required for moving control surfaces in the context of the present invention, the actuating device is provided with six linear actuators 210.

In plan view, the six actuator 210 centrelines form a hexagonal figure. Where the actuators 210 are all at equal length (i.e. mid stroke) and if the effective rotatable and fixed member diameters were the same, this is a regular hexagon. As alternate actuators 210 expand and contract to maintain the centre locus while rotating the rotatable member 220a to a limit value (in this case +/−22.5 degrees), the mechanical advantage to power the rotation changes, and the mid-point of the longer actuators moves towards the engine casing disposed such that it passes through the figure defined by the actuators 210 (shown in FIGS. 4a and 4b). These variables, along with the available stroke and the distance between the rotatable and fixed members give a practical limit to the motion. Thus each pair of actuators 210 occupies a 120 degree segment of the circle to achieve a +/−22.5 degrees rotary motion (where the zero degree point is where all actuators 210 are equally extended). If a greater number of actuators was used (for example, eight) each pair would occupy a 90 degree segment of the circle and could no longer extend to achieve this rotation.

In other words, the optimal number of actuators 210 is six. If more were used, the necessary 45 degree translation of the tail surface 30a, 30b could not be achieved. Meanwhile, if fewer actuators 210 were used, the rotatable member 220a would lose a structural constraint (i.e. become unbounded and lose rigidity in at least one axis).

The actuators 210 include a coupling device to pivotably connect the actuators 210 to the rotatable member 220a and fixed member 220b. In certain embodiments, the actuators 210 have a coupling device at each end. The coupling devices have spherical bearings. In the embodiment shown here, the coupling devices are in the form of universal joints which allow adequate freedom of rotation to achieve the required mechanism motions. In other embodiments, the actuators 210 include ball joints at both ends for coupling to sockets. In other embodiments, the actuators 210 include dual-axis hinges. In further embodiments, any of the previously described coupling devices may be combined in the same actuating device 200. The actuators 210 include pistons between the universal joints for driving the universal joints apart or bringing them together. The pistons are hydraulically actuated. In other embodiments, the pistons are pneumatically actuated. In other embodiments, the pistons are driven by an electric motor.

The universal joints at one end of the actuators 210 are connected to the rotatable member 220a. The universal joints at the opposite end of the actuators 210 are connected to the fixed member 220b. While the fixed member 220b is fixed relative to the body of the aircraft 100, the rotatable member 220a is able to tilt and rotate according to which actuators 210 are extended and which are retracted. This will be explained in more detail later with reference to FIGS. 4a and 4b. In the embodiments shown, the rotatable and fixed members 220a, 220b are ring-shaped, or annuli.

The actuators 210 are arranged in pairs, such that for a first pair of actuators 210 the universal joints at one end are disposed proximate to each other when connected to the rotatable member 220a. Meanwhile, the universal joints at the opposite end of the same pair of actuators 210 are spaced apart from each other and disposed proximate to the universal joints of another pair of actuators 210.

While linear actuators 210 in the forms of pistons have been shown and described herein, it would be appreciated that the rotatable member 220a and fixed member 220b may be coupled by other driving means, such as a rack and pinion, worm drive or direct motor. However, it would require a complex and heavy arrangement of such driving means to provide the same degrees of freedom provided by the actuating device 200 shown in FIG. 2. Moreover, the embodiment having a plurality of pistons provides a level of redundancy not found when the other driving means are used.

While the actuating device 200 according to embodiments described above, comprising pistons 210 and ring-shaped rotatable and fixed members 220a, 220b, is limited by geometry to cause a maximum 60 degree deflection of the control surface relative to the local horizontal plane, it would be appreciated that other actuating devices could be used to provide an adaptable control surface capable of 90 degrees of dihedral and/or anhedral deflection. For instance the stator (fixed member 220b) and rotor (rotatable member 220a) of the present invention could be integrated with the stator and rotor of an electric motor.

Figure 2:
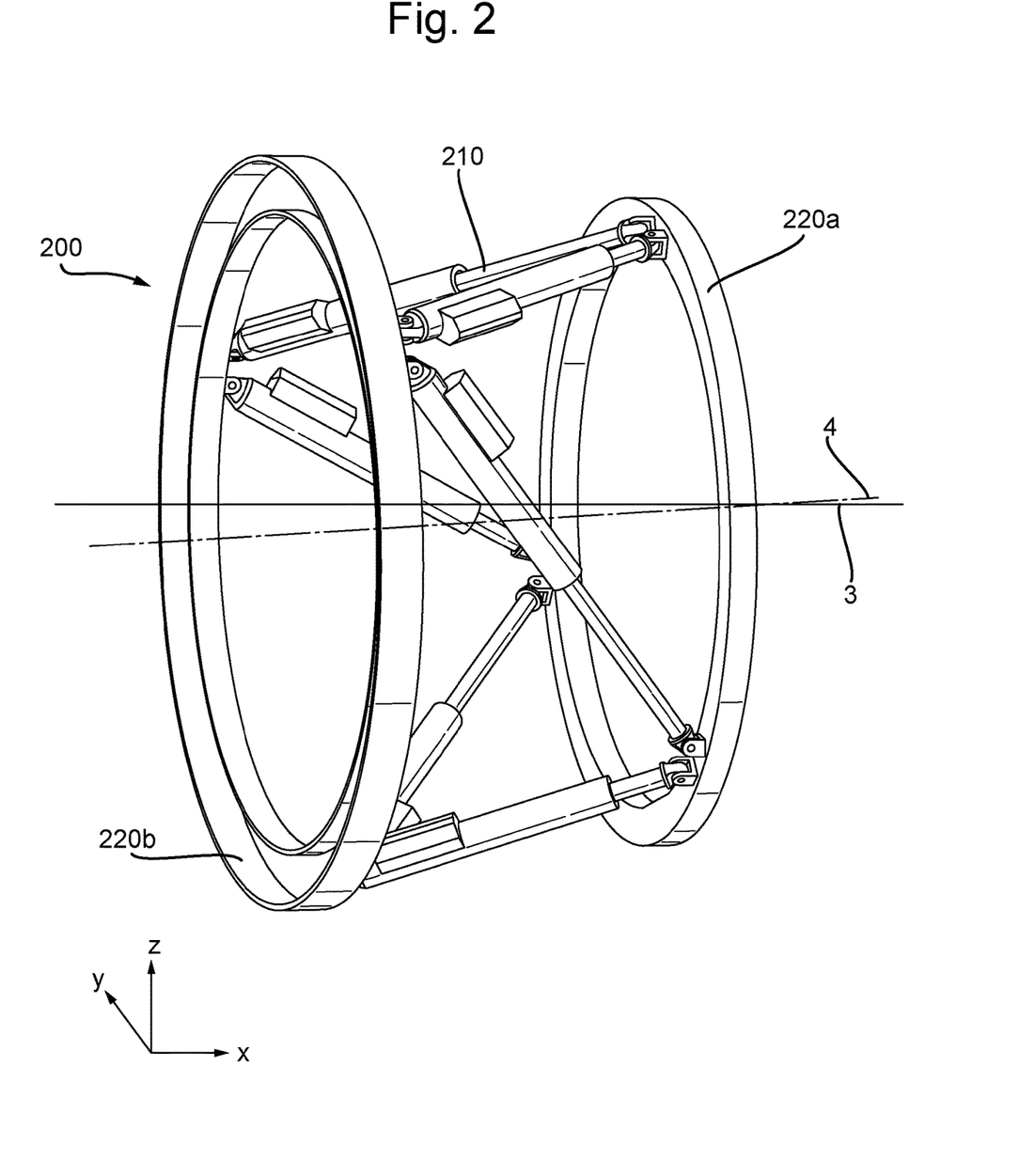
FIG. 2 is a perspective view of an actuating device according to embodiments of the present invention.

FIG. 2 shows the central axis 3 of the rotatable member 220a and the central axis 4 of the fixed member 220b. These central axes 3, 4 are parallel and collinear when the rotatable member 220a is not tilted.

Figure 3A:
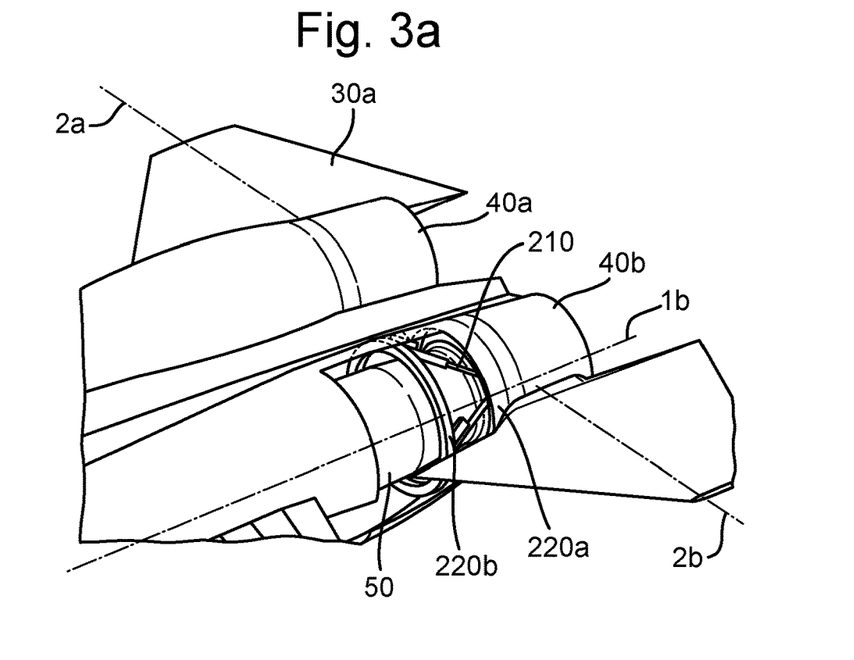
FIG. 3a is a perspective view of an empennage having control surfaces in a first position according to embodiments of the present invention.

An empennage featuring the present invention will now be described with reference to FIGS. 3a and 3b. FIG. 3a shows tail surfaces 30a, 30b arranged in horizontal configuration (or 0 degrees dihedral). Here, the term horizontal is used in relation to the local reference frame of the aircraft 100, and is therefore not necessarily parallel to the horizon. Horizontal means the tail surfaces 30a, 30b are substantially co-planar with each other and the aircraft's 100 horizontal plane (i.e. substantially co-planar with the wings 10a, 10b). In other words, the lateral axes 2a, 2b of each tail surface 30a, 30b are not inclined relative to each other. When the tail surfaces 30a, 30b are horizontal, the distance between the outboard edges of the tail surfaces is at its greatest. Rotating the tail surfaces 30a, 30b about their lateral axes 2a, 2b will cause the aircraft's 100 nose 20 to pitch up or down (in the aircraft's local frame of reference). This configuration is particularly useful when the aircraft 100 is travelling at supersonic speeds and the pilot has no need to change the heading of the aircraft 100. Moreover, this configuration is useful when the aircraft 100 is required to present a low radar cross section.

Figure 3B:
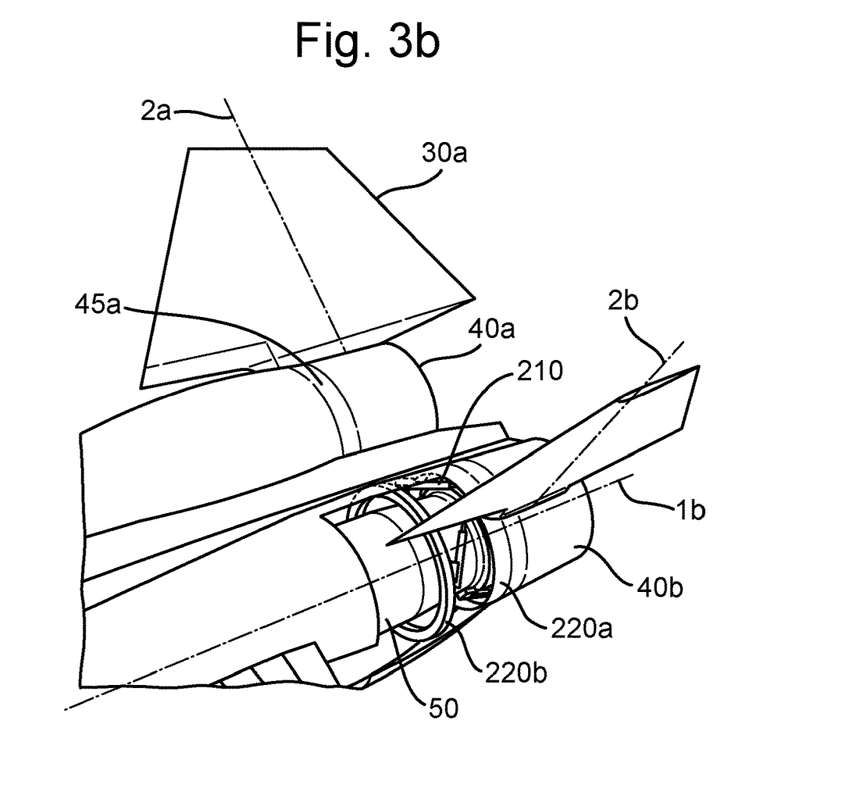
FIG. 3b is a perspective view of an empennage having control surfaces in a second position according to embodiments of the present invention.

Meanwhile, FIG. 3b shows the tail surfaces 30a, 30b in a configuration in which they are arranged at 45 degrees to the local horizontal plane as defined above. The lateral axes 2a, 2b of the tail surfaces 30a, 30b form an angle of 90 degrees between each other. In other words, here the tail surfaces 30a, 30b make an angle of 45 degrees with a plane generally parallel with the wings 10a, 10b. In this configuration, the tail surfaces 30a, 30b can be used to control yaw of the aircraft 100 and/or pitch of the aircraft 100.

In further embodiments, the actuating devices 200 are configured to allow the tail surfaces 30a, 30b to rotate about the central axes 3 of the rotatable members 220a to be perpendicular to the local horizontal plane as explained above. In other words, in this configuration, the lateral axes 2a, 2b of the tail surfaces 30a, 30b do not intersect each other.

FIGS. 3a and 3b show a cutaway part on one side of the empennage. The internal structure of the corresponding part of the side not shown in cutaway is identical to the structure described below for the cutaway part.

The empennage according to this embodiment includes two engines 50 laterally displaced either side of the central axis 1a. In other embodiments, there may only be a single engine, or an engine may be disposed elsewhere on the aircraft 100 and not form part of the present invention. While jet engines are shown here, the engines 50 may also be ram jet engines, rocket engines or hybrid engines.

An actuating device 200 as described with reference to FIG. 2 is disposed around each engine 50. Here, a jet engine is disposed such that it passes through the annuli or the rotatable member 220a and fixed member 220b. The casing of the engine 50 and its exhaust have a circular cross section.

The tail surfaces 30a, 30b are coupled radially to the outside edge of respective rotatable members 220a and extend outward therefrom. Therefore, when the actuators 210 extend or retract in a predetermined way, the tail surfaces 30a, 30b are caused to rotate about the longitudinal axis 3 of the rotatable member 220a to be horizontal (i.e. transverse to the fuselage 15) as in FIG. 3a or make an angle with the local horizontal plane as shown in FIG. 3b.

The outside edge of the fixed member 220b is fixed to the inside wall of the fuselage 15 such that its longitudinal axis 4 is parallel to the longitudinal axis 1a of the fuselage 15. When all actuators 210 are at their mid-stroke neutral position, the central axis 3 of the rotatable member 220a is arranged collinearly with the central axis 4 of the fixed member 220b. The outside periphery of the rotatable member 220a forms part of the outside surface of the aircraft 100. The rotatable member 220a comprises a baffle for coupling it to the fuselage 15 to prevent gaps forming in the outside surface of the aircraft 100 when the rotatable ring 220a pivots up, down, left or right with respect to the fuselage 15.

While dihedral deflection of the tail surfaces 30a, 30b is shown in FIG. 3b, the present invention can also be used to deflect the tail surfaces 30a, 30b anhedrally (i.e. downwards relative to the local horizontal plane).

The engine exhaust nozzles 40a, 40b are coupled axially to the periphery of respective rotatable members 220a. Therefore, when the central axis 3 of the rotatable member 220a is caused to be inclined relative to the central axis 4 of the fixed member 220b, such that the central axis 3 of the rotatable member 220a makes an angle with that of the fixed member 220b, the engine exhaust nozzle 40a is pivoted such that its longitudinal axis 1b makes the same angle with the central axis 4 of the fixed member 220b. For example, the engine exhaust nozzle 40a can be controlled to point up or down relative to the fuselage 15. Therefore, a flow path of the engine exhaust through the empennage is adjusted. This is known as thrust vectoring.

In these embodiments, the present invention alleviates the need for an aircraft to have both a horizontal tail plane and a tail fin, as it allows the empennage to be adaptable to perform the function of both features. Therefore, radar cross section of the aircraft 100 and drag tend to be reduced when necessary, and the performance envelope of the aircraft 100 tends to be dynamically controllable. Moreover, the aircraft 100 is generally lighter than an aircraft having both horizontal and vertical tail surfaces.

In other embodiments, instead of or in addition to the tail surfaces 30a, 30b, control surfaces such as the main wings 10a, 10b, weapons pylons or front canards of the aircraft 100 can be controlled in a similar manner to that described above.

The present invention will now be described in more detail with respect to FIGS. 4a and 4b. These Figures show cross sections through the longitudinal axis of the port side of the empennage shown in FIGS. 3a and 3b. The view is taken from the nose 20 of the aircraft 100 through to the tail.

As shown, the engine casing surrounding the engine 50 is cylindrical. When actuators 210 surrounding the engine casing are at maximum extension, the midpoints of each fully extended actuator 210 are accommodated by a recess in the casing. A clearance should be maintained between moving and static parts, with enough allowance for emergency extension limits of the actuators 210 without contact with equipment disposed between the plurality of actuators 210.

The actuators 210 are arranged in pairs. First actuator 210a and second actuator 210b form a first pair of actuators. Third actuator 210c and fourth actuator 210d form a second pair of actuators. Fifth actuator 210e and sixth actuator 210f form a third pair of actuators. As shown in FIGS. 4a and 4b, the area between the engine casing and the skin of the aircraft 100 is limited. To include more actuators 210 would reduce the angular range in which each actuator operates and therefore prevent the tail surface 30b rotating to 45 degrees above the local horizontal plane. Meanwhile, fewer actuators 210 would reduce the degrees of freedom of the rotatable member 220a.

In certain embodiments, the number of actuators 210 is an even number. The number of actuators 210 could therefore be reduced to four. In either a symmetrical or asymmetrical array, assuming pin-joint behaviour, these would then act like two joined 4-bar links, and could not be constrained in all degrees of freedom without additional constraint at the rotational centre, which cannot be achieved when an engine 50 is in the way.

The rotatable member 220a is of a smaller diameter than the fixed member 220b and is axially yet collinearly spaced apart from the fixed member 220b. Here, the rotatable member 220a is shown being further aft in the empennage than the fixed member 220b. In some embodiments, the rotatable member 220a is disposed forward of the fixed member 220b with respect to the nose 20 of the aircraft 100.

The tail surface 30b is coupled to the rotatable member 220a by any suitable means. For example, the tail surface 30b may be riveted, bolted or welded to the rotatable member 220a. In other embodiments, the rotatable member 220a and tail surface 30b are formed as a single integrated unit. In further embodiments, a tail cone (or fairing) is coupled axially to the rotatable member 220a, and the tail surface 30b is instead coupled to the tail cone in a similar manner to as previously described. Therefore, when the rotatable member 220a rotates, the tail surface 30b pivots about the longitudinal axis of the rotatable member 220a.

Figure 6:
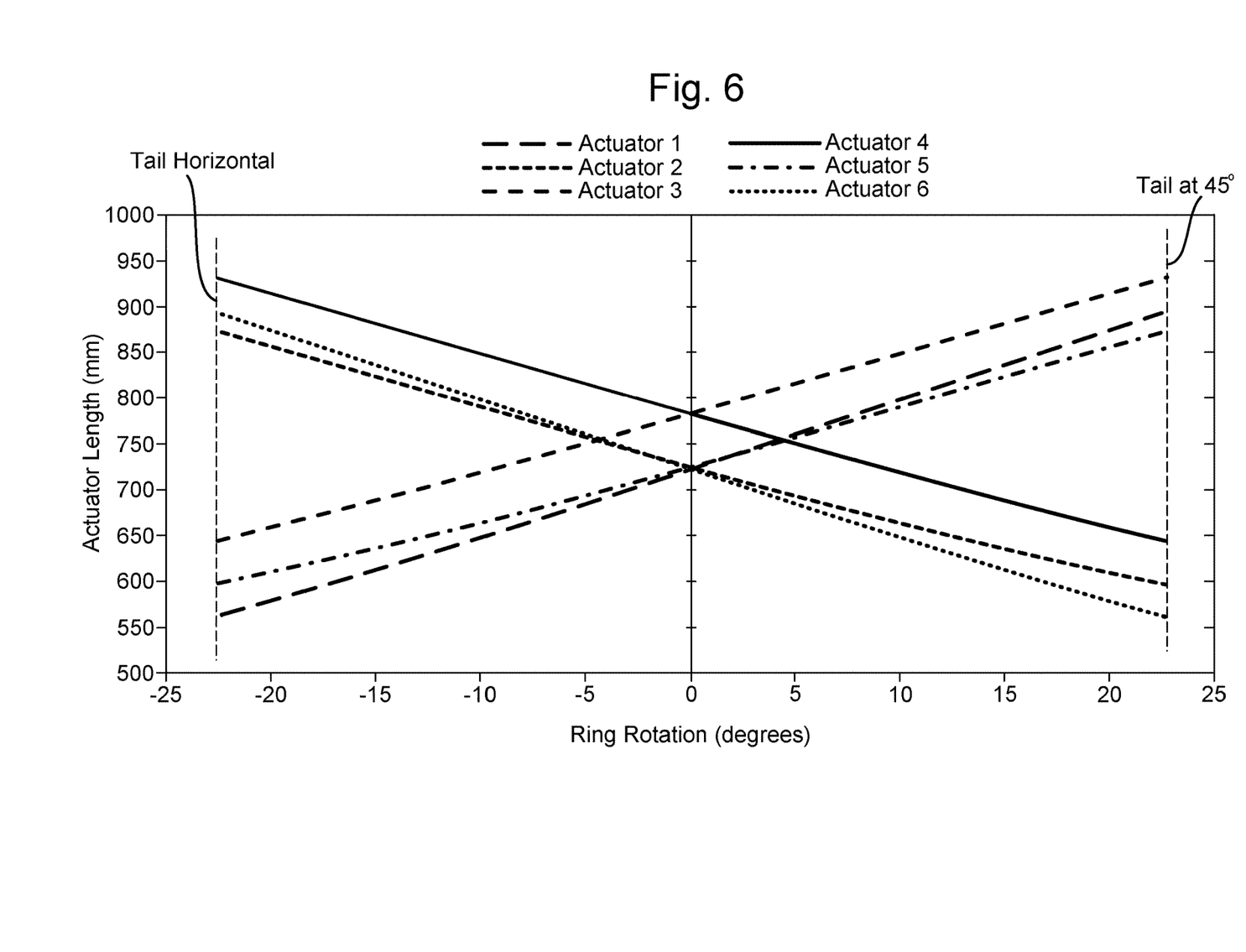
FIG. 6 is a graph demonstrating an example of how each actuator in an actuating device shown in FIG. 2 extends to provide first and second positions of the control surface.
Figure 7:
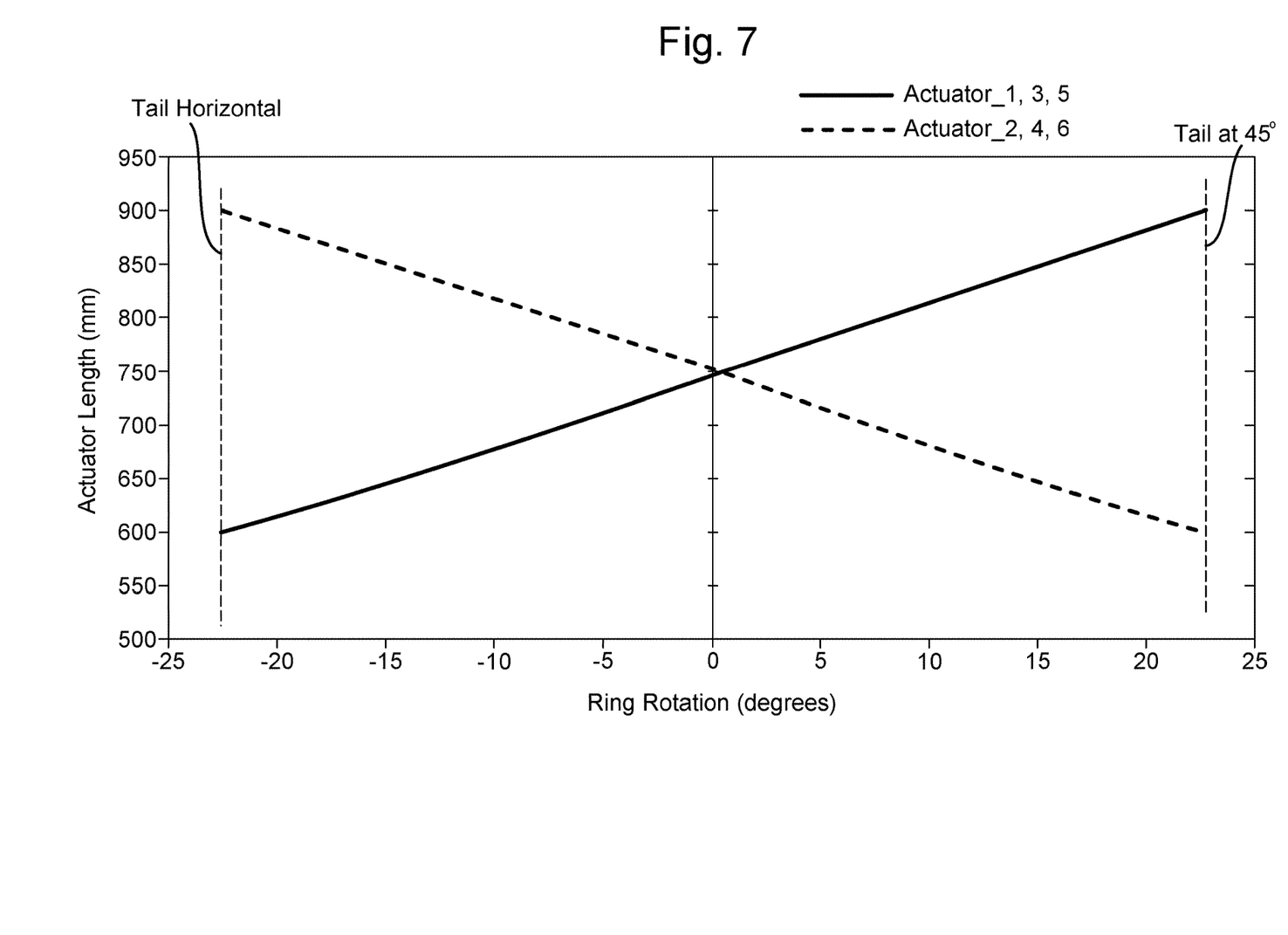
FIG. 7 is a graph demonstrating another example of how each actuator in an actuating device shown in FIG. 2 extends to provide first and second positions of the control surface.

In order to fully rotate the tail surface 30b to 45 degrees with respect to the local horizontal plane, which is the plane parallel to the horizon when the aircraft 100 is flying straight and level (i.e. in the same plane as the primary longitudinal axis 1a of the aircraft 100), the second actuator 210b, fourth actuator 210d and sixth actuator 210f extend in unison, while the first actuator 210a, third actuator 210c and fifth actuator 210e retract in unison. The resulting configuration is shown in FIG. 4b. In order to bring the tail surface 30b back to the local horizontal plane, the second actuator 210b, fourth actuator 210d and sixth actuator 210f retract in unison, while the first actuator 210a, third actuator 210c and fifth actuator 210e extend in unison. The resulting configuration is shown in FIG. 4a. As shown in FIGS. 6 and 7, intermediate dihedral inclinations of the tail surface 30b can be achieved through predetermined combinations of actuator extensions. The desired pitch of the tail surface 30b can be maintained while the tail surface 30b moves dihedrally.

If one of the actuators 210 malfunctions (e.g. jams), it is possible for some degree of control of the tail surface 30b to be maintained through actuation of the remaining actuators 210. The end of the failed actuator coupled to the rotatable member 220a is swung further aft of the vehicle 100 by its paired actuator extending. The remaining two pairs of actuators translate in unison to allow this motion, which moves the rotatable member 220a further aft and out of standard alignment with the fixed member 220b. This new aft position can be used as a basis for reversionary motions of the remaining five actuators. Although full freedom of movement will not be achieved, enough control can be maintained until the aircraft 100 is brought to a stop (or, where an aircraft, lands).

By extending each of the first actuator 210a and second actuator 210b by a greater amount than that of the third through sixth actuators 210c-f, the rotatable member 220a can be pivoted such that its central longitudinal axis 3 of the rotatable member 220a makes an angle with the longitudinal axis 4 of the fixed member 220b. In the embodiment shown here, where an engine 50 extends through the fixed member 220b and an engine exhaust nozzle 40b is coupled to the rotatable member 220a, pivoting the central longitudinal axis 3 of the rotatable member 220a away from the central longitudinal axis 4 of the fixed member 220b causes the thrust generated by the engine 50 to be vectored thereby providing the aircraft 100 with increased manoeuvrability. This is useful, for example, in aircraft and water-jet powered vehicles 100 such as jet skis and torpedoes.

In further embodiments, sensors such as imaging systems and radar warning receivers are disposed on the distal tips of the tail surfaces 30a, 30b. Therefore, by controlling the tail surfaces 30a, 30b to move out of the aircraft's 100 primary horizontal plane (i.e. anhedrally or dihedrally), the obscuration of the field of regard of the sensors by the aircraft's 100 fuselage 15 or wings 10a, 10b can be reduced.

Figure 4A:
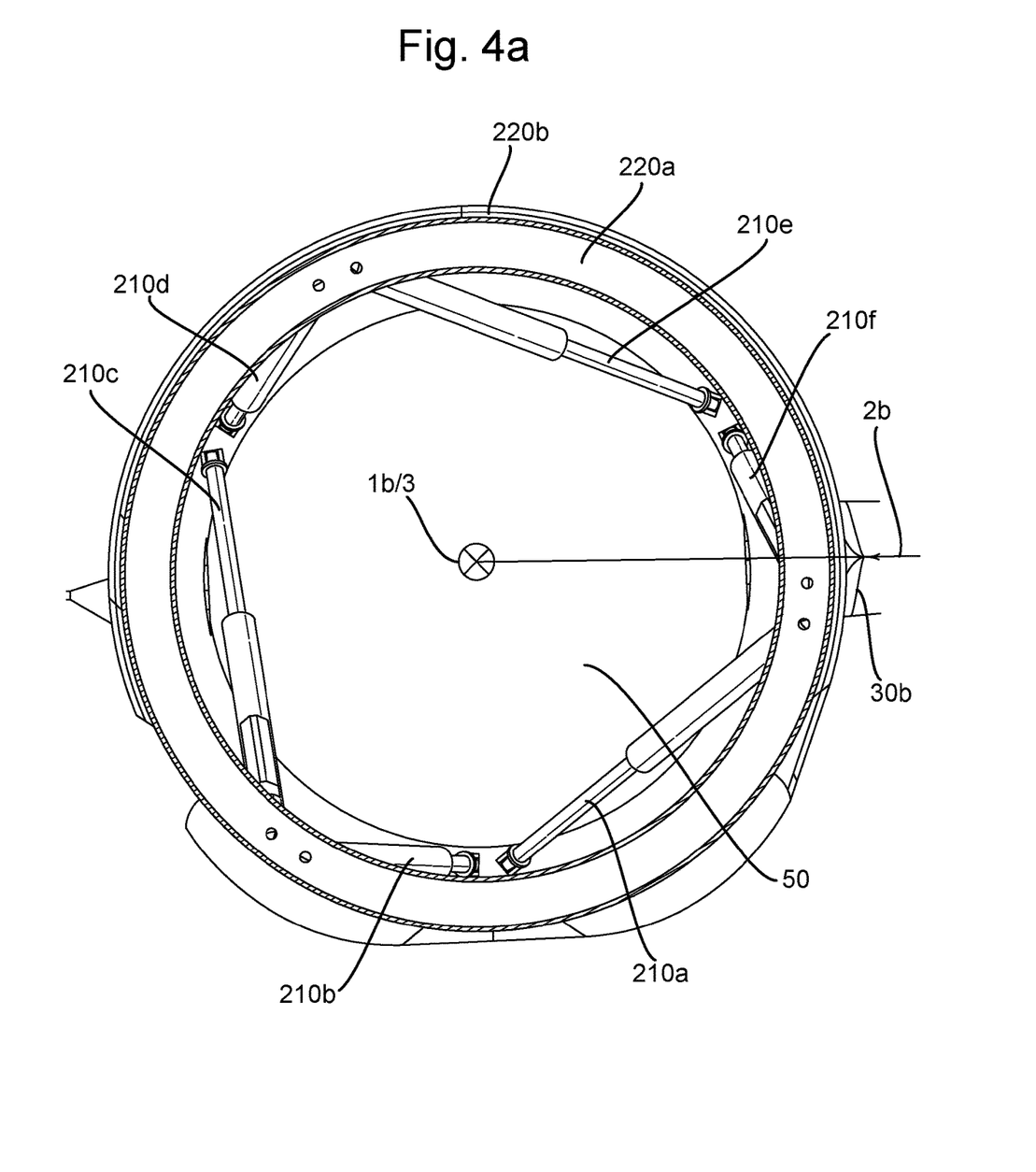
FIGS. 4a and 4b are cross-sections through the empennage shown respectively in FIGS. 3a and 3b.
Figure 4B:
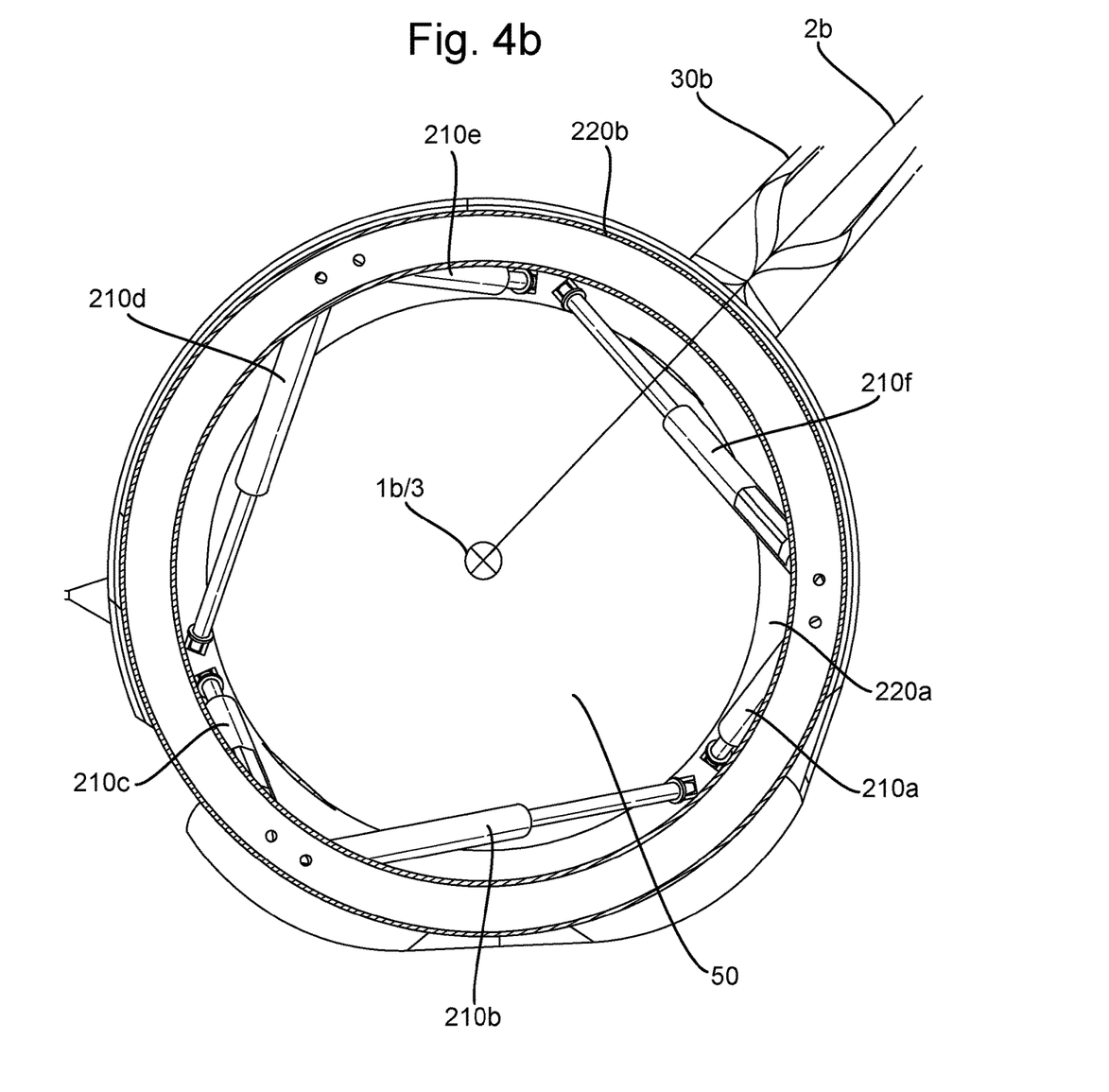

In the embodiment shown here, the same features shown in FIG. 4a are mirrored on the starboard side of the aircraft 100 in order to provide the aircraft 100 with two adaptable tail surfaces 30a, 30b.

Figure 5A:
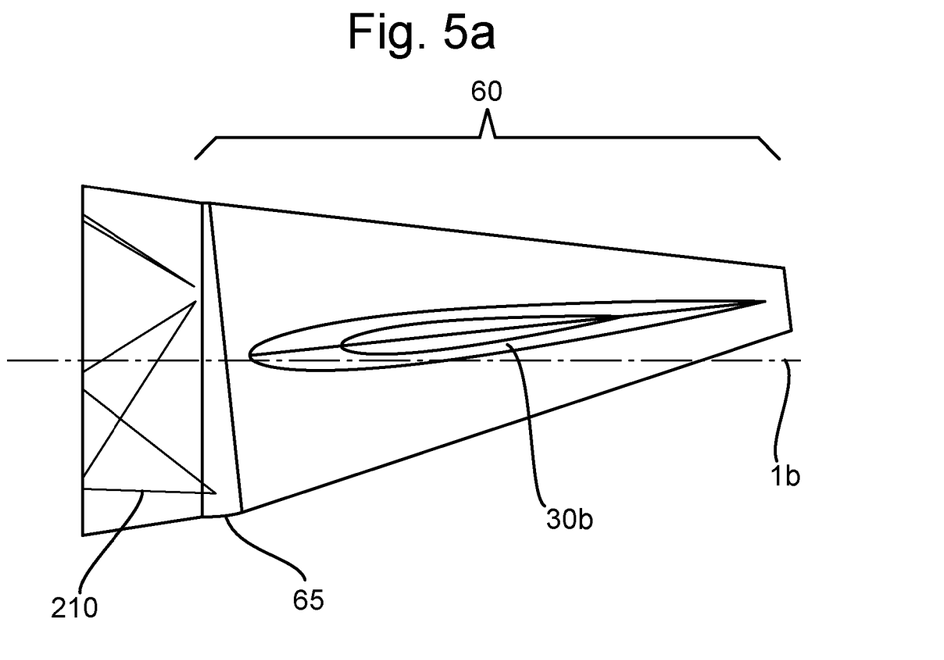
FIGS. 5a and 5b show, respectively, a side view and a perspective view of an empennage according to an alternative embodiment of the present invention.
Figure 5B:
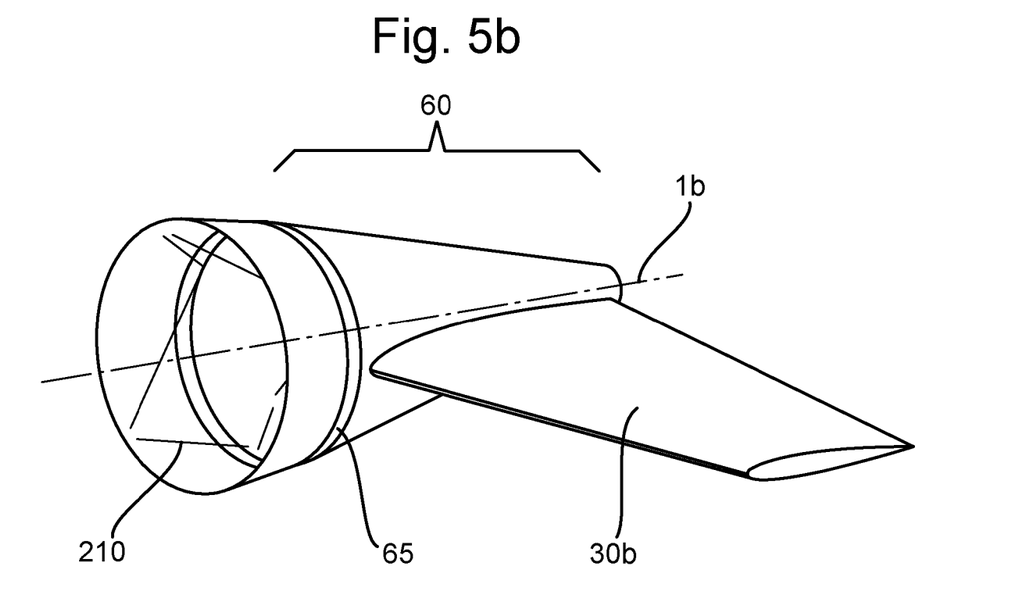

FIGS. 5a and 5b show an alternative arrangement for causing movement of a tail surface 30b. Here, the actuators 210 are coupled directly to the inside surface of a tail fairing (or tail cone) 60. The opposite end of each actuator 210 is coupled to the inside surface of the fuselage 15, for example a fuselage, of the aircraft 100. A hinge 65 couples the tail fairing 60 to the fuselage 15. The hinge 65 is able to compress and expand to prevent gaps forming between the tail fairing 60 and the fuselage 15 when the tail fairing 60 is moved. The hinge 65 acts as a baffle. In effect, the tail fairing 60 is an elongated rotatable member 220a as previously described with reference to FIGS. 3a to 4b. Meanwhile, in effect the fuselage 15 of the aircraft 100 acts as a fixed member 200b as previously described with reference to FIGS. 3a to 4b.

A planar tail surface 30b is coupled to the tail fairing 60. The planar tail surface 30b may be coupled to the tail fairing 60 by any suitable means, such as bolting, riveting, welding, or the tail surface 30b and tail fairing 60 may be integrally formed.

In further embodiments, an auxiliary power unit (APU) is disposed inside the tail fairing. Here, the distal end of the tail fairing 60 comprises an engine exhaust nozzle. In some embodiments, sensors, such as magnetic anomaly detectors or synthetic aperture radars, are disposed on the tail fairing 60 of the aircraft 100. Therefore, the direction in which these sensors point can be adjusted by pivoting the tail fairing 60 using the appropriate actuators 210.

Similarly to as shown in FIGS. 2a and 2b, two actuating devices 200 may be disposed side-by-side (or in parallel) to provide two adaptable tail surfaces 30a, 30b. These two tail surfaces 30a, 30b can then rotate upwards, i.e. dihedrally, to provide an aircraft 100 with a twin tail fin. Such rotation would tend to happen in unison so that each tail fin was inclined by an equivalent angle to the horizontal plane.

In other embodiments again, two actuating devices 200 are coupled axially in the same aircraft 100. In other words, the rotatable member 220a of one actuating device 200 is disposed proximate to the distal end of another actuating device 200, or concentrically with the other actuating device. A control surface is coupled to the rotatable plate 220a of each actuating device 200 on opposite sides to each other. This embodiment is particularly useful where the control surfaces are canards towards the front of the aircraft 100 or where there the aircraft 100 has only a single tail cone or engine fairing about which a tail surface 30a, 30b can rotate.

FIG. 6 shows experimental data plotted for extensions of actuators 210 necessary to achieve different degrees of dihedral displacement of tail surfaces 30a, 30b at a pitch angle of 6 degrees (i.e. the tail surfaces 30a, 30b are pivoted about their lateral axes 2a, 2b by 6 degrees relative to the local horizontal plane). Here, the tail cone 60 diameter is 1200 mm. The graph shows a slightly non-linear relationship between extension of the actuators 210 and resultant rotation of the rotatable member 220a when pitch of the tail surface 30a, 30b is also effected. When the rotatable member 220a has a rotation of zero degrees, all six actuators 210 are partly extended.

FIG. 7 shows experimental data plotted for extensions of actuators 210 necessary to achieve different degrees of dihedral displacement of tail surfaces 30a, 30b at a pitch angle of 0 degrees. Here, the tail cone 60 diameter is 1200 mm. The graph shows a linear relationship between rotation of the rotatable member 220a and extension of the actuators 210 when there is no pitch or yaw effected in the tail surface 30a, 30b.

The aforementioned embodiments provide a control surface able to move from a first position to a second position by rotating about a point inside the main body of the aircraft 100. While a tail surface 30a, 30b has been described as moving from the local horizontal plane to a plane at 45 degrees to the horizontal, it would be readily appreciated that the first position need not be the local horizontal plane. For example, the actuating device 200 could rotate the tail surface 30a, 30b from the plane at 45 degrees to the local horizontal to the local vertical plane of the aircraft 100.

By using the actuating device 200 described above to cause the tail surface 30a, 30b (or any other control surface) to rotate about a longitudinal axis 4 of the rotatable member 220a, instead of rotating about the root of the tail surface 30a, 30b, the need for external joints is alleviated. Therefore, radar cross section tends to be reduced.

While plus/minus 22.5 degree motion limits of the rotatable member 220a have been used for the embodiments described above, other limits of angularity may be attained, dependant on actuator 210 and fixed/rotatable member 220a, 220b geometry. For instance, if the stator 220b and rotor 220a were provided by the stator and rotor of an electric motor, the range of inclinations relative to the horizontal plane would be increased.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

What is claimed is:

1. A vehicle comprising:
    a rotor and a stator;
    at least one planar control surface coupled to the rotor, such that the control surface extends perpendicularly from the periphery of the rotor, wherein the rotor is configured to rotate relative to the stator such that, in use, the at least one planar control surface moves from a first position to a second position, and wherein:
        in the first position the planar control surface is controllable to affect only the pitch of the vehicle and in the second position the planar control surface is controllable to affect both of the pitch and yaw of the vehicle, or only the yaw; or
        in the first position the planar control surface is controllable to affect only the yaw of the vehicle and in the second position the planar control surface is controllable to affect both of the pitch and yaw of the vehicle, or only the pitch of the vehicle; and
    at least one actuator coupled to the rotor and to the stator, wherein the control surface is coupled to the rotor such that the control surface extends perpendicularly from the periphery of the rotor wherein, in use, when a first actuator is in a first configuration the rotor is rotated such that the planar control surface is arranged in the first position, and when the first actuator is in a second configuration the rotor is rotated such that the planar control surface rotates about the central axis of the rotor to be arranged in the second position, wherein the at least one actuator comprises a plurality of actuators arranged in pairs; and
    first and second pistons, each pivotably connected to the rotor and to the stator;
    wherein, in use, when the first piston is in a first configuration the rotor is rotated such that the planar control surface is arranged in the first position, and when the first piston is in a second configuration, the rotor is rotated such that the planar control surface rotates about the central axis of the rotor to be arranged in the second position; and
    wherein, in use, when the first piston extends, the second piston retracts to cause rotation of the rotor.

2. The vehicle according to claim 1, wherein a longitudinal axis of the vehicle and central axis of the stator are arranged in parallel.

3. The vehicle according to claim 1, wherein in the first position the planar control surface is co-planar with the local horizontal plane of the vehicle and in the second position the planar control surface is arranged in a plane at 45 degrees to the local horizontal plane.

4. The vehicle according to claim 1, wherein the plurality of actuators consists of only three pairs of actuators.

5. The vehicle according to claim 1, wherein the plurality of actuators define an elongate space having the stator and rotor disposed at the longitudinal ends of the elongate space, and wherein the stator and rotor are annular.

6. The vehicle according to claim 5, wherein an engine is disposed in the elongate space.

7. The vehicle according to claim 6, wherein the at least one actuator is configured to incline the central axis of the rotor with respect to the central axis of the stator in order to vector the thrust of the engine;
    wherein the inclination of the central axis is symmetric within a cone about the central axis.

8. The vehicle according to claim 5, wherein, in use, when one actuator expands another actuator retracts to cause rotation of the rotor only about the central axis of the rotor.

9. The vehicle according to claim 1, comprising a second rotor and a second stator, the second rotor being coupled to a second planar control surface, wherein the second rotor is configured to rotate relative to the second stator such that, in use, the second planar control surface moves from the first position to the second position, and wherein the rotor is arranged adjacent and parallel to the second rotor such that the planar control surface and the second planar control surface are arranged on opposite sides of the vehicle with respect to each other.

10. The vehicle according to claim 1, wherein the vehicle is an aircraft.

11. The vehicle according to claim 10, wherein the planar control surface is a tail plane; and
    wherein the rotor is a tail cone.

12. The vehicle of claim 1, wherein the rotor comprises an open-ring rotatable rotor member to which a rotor end of the actuators are attached, wherein an outside edge of the open-ring rotatable rotor member is coupled to an inner wall of a tail surface of the vehicle; and
    the stator comprises an open-ring fixed stator member to which opposite, stator, ends of the actuators are attached, wherein an outside edge of the open-ring fixed stator member is coupled to an inner wall of a fuselage of the vehicle;
    wherein an outer diameter of the open-ring rotatable rotor member is less than an outer diameter of the open-ring fixed stator member, whereby a flow is maintained.

13. The vehicle of claim 1, wherein the actuators are coupled directly to an inside surface of a tail fairing; and
    an opposite end of each actuator is coupled directly to an inside surface of a fuselage.

14. The vehicle of claim 1, wherein the rotatable member comprises a baffle for coupling a tail fairing to a fuselage wherein the baffle is able to compress and expand to reduce radar cross section and to prevent gaps forming in the outside surface of the vehicle when the rotatable member pivots up, down, left or right with respect to the fuselage.

15. The vehicle according to claim 1, wherein the plurality of actuators define an elongate space having the stator and rotor disposed at the longitudinal ends of the elongate space, and wherein the stator and rotor are annular; and
    wherein an engine is disposed in the elongate space;
    the engine surrounded by a cylindrical engine casing;
    wherein the cylindrical engine casing comprises recesses whereby, when actuators surrounding the cylindrical engine casing are at maximum extension, midpoints of each fully extended actuator are accommodated by the recesses in the cylindrical engine casing;
    whereby a clearance is maintained between moving and static parts, with clearance for emergency extension limits of the actuators without contact with equipment disposed between the plurality of actuators.

16. A method of controlling a vehicle comprising:
    providing a rotating rotor relative to a stator, a planar control surface being coupled to the rotor, such that the planar control surface moves from a first position to a second position, such that the control surface extends perpendicularly from the periphery of the rotor, wherein:
        in the first position the planar control surface is controllable to affect only the pitch of the vehicle and in the second position the planar control surface is controllable to affect both of the pitch and yaw of the vehicle, or only the yaw; or in the first position the planar control surface is controllable to affect only the yaw of the vehicle and in the second position the planar control surface is controllable to affect both of the pitch and yaw of the vehicle, or only the pitch; and at least one actuator coupled to the rotor and to the stator, wherein the control surface is coupled to the rotor such that the control surface extends perpendicularly from the periphery of the rotor wherein, in use, when a first actuator is in a first configuration the rotor is rotated such that the planar control surface is arranged in the first position, and when the first actuator is in a second configuration the rotor is rotated such that the planar control surface rotates about the central axis of the rotor to be arranged in the second position, wherein the at least one actuator comprises a plurality of actuators arranged in pairs; and first and second pistons, each pivotably connected to the rotor and to the stator;

wherein, in use, when the first piston is in a first configuration the rotor is rotated such that the planar control surface is arranged in the first position, and when the first piston is in a second configuration, the rotor is rotated such that the planar control surface rotates about the central axis of the rotor to be arranged in the second position; and wherein, in use, when the first piston extends, the second piston retracts to cause rotation of the rotor.

17. The method according to claim 16, comprising rotating the rotor +/−22.5 degrees relative to the stator to effect a 45 degree rotation of the planar control surface relative to a fixed plane.

18. The method according to claim 16, comprising controlling a first one of a plurality of actuators to expand while controlling a second one of the plurality of actuators to retract to cause rotation of the rotor only about the central axis of the rotor.

19. The method of controlling a vehicle of claim 16, wherein the method comprises a malfunction failsafe method, the malfunction failsafe method comprising the steps of:

initiating, upon malfunction of one of the actuators, wherein the plurality of actuators arranged in pairs comprises three pairs of actuators;

swinging an end of the failed malfunctioning actuator coupled to the rotatable member further aft of the vehicle by extending its paired actuator;

translating, in unison, the remaining two pairs of actuators to allow this motion, whereby the rotatable member moves further aft and out of a standard alignment with the fixed member into a new aft position;

wherein the new aft position is a basis for reversionary motions of the remaining five actuators, wherein full freedom of movement is not achieved, but control is maintained until the vehicle is brought to a stop.

20. A method of controlling a vehicle comprising:

providing a rotating rotor relative to a stator, a planar control surface being coupled to the rotor, such that the control surface extends perpendicularly from the periphery of the rotor, such that the planar control surface moves from a first position to a second position, wherein:

in the first position the planar control surface is controllable to affect only the pitch of the vehicle and in the second position the planar control surface is controllable to affect both of the pitch and yaw of the vehicle, or only the yaw; or in the first position the planar control surface is controllable to affect only the yaw of the vehicle and in the second position the planar control surface is controllable to affect both of the pitch and yaw of the vehicle, or only the pitch;

comprising changing a flow path through the vehicle by controlling at least one actuator to incline the central axis of the rotor relative to the central axis of the stator;

wherein the inclination of the central axis is symmetric within a cone about the central axis; and first and second pistons, each pivotably connected to the rotor and to the stator;

wherein, in use, when the first piston is in a first configuration the rotor is rotated such that the planar control surface is arranged in the first position, and when the first piston is in a second configuration, the rotor is rotated such that the planar control surface rotates about the central axis of the rotor to be arranged in the second position; and wherein, in use, when the first piston extends, the second piston retracts to cause rotation of the rotor.

* * * * *

UNITED STATES PATENT AND TRADEMARK OFFICE
CERTIFICATE OF CORRECTION

PATENT NO. : 10,899,429 B2
APPLICATION NO. : 16/637799
DATED : January 26, 2021
INVENTOR(S) : Andrew Charles White It is certified that error appears in the above-identified patent and that said Letters Patent is hereby corrected as shown below:

In the Claims

Claim 8 should read as follows:
The vehicle according to claim 1, wherein, in use, when one actuator expands another actuator retracts to cause rotation of the rotor only about the central axis of the rotor.

Signed and Sealed this
Second Day of August, 2022

Katherine Kelly Vidal
*Director of the United States Patent and Trademark Office*